(12) United States Patent
Price et al.

(10) Patent No.: US 7,747,636 B1
(45) Date of Patent: Jun. 29, 2010

(54) SYSTEM FOR PROVIDING INFORMATION TO LOCAL REAL ESTATE PURCHASER

(76) Inventors: Randy F. Price, 33 Sea Island Dr., Newport Beach, CA (US) 92660; Laurence Fish, 1840 Lyndon Rd., San Diego, CA (US) 92103; Scott C. Harris, P.O. Box 1389, Rancho Santa Fe, CA (US) 92067-1389

( * ) Notice: Subject to any disclaimer, the term of this patent is extended or adjusted under 35 U.S.C. 154(b) by 319 days.

(21) Appl. No.: 11/245,541

(22) Filed: Sep. 30, 2005

Related U.S. Application Data

(60) Provisional application No. 60/674,172, filed on Apr. 21, 2005.

(51) Int. Cl.
*G06F 7/00* (2006.01)

(52) U.S. Cl. ....................................................... 707/758
(58) Field of Classification Search .................. None
See application file for complete search history.

(56) References Cited

U.S. PATENT DOCUMENTS

| | | | | |
|---|---|---|---|---|
| 6,199,099 | B1 * | 3/2001 | Gershman et al. | 709/203 |
| 6,327,594 | B1 * | 12/2001 | Van Huben et al. | 707/200 |
| 6,356,905 | B1 * | 3/2002 | Gershman et al. | 707/10 |
| 6,883,000 | B1 * | 4/2005 | Gropper | 707/10 |
| 2003/0144945 | A1 * | 7/2003 | Opsahl-Ong et al. | 705/37 |
| 2004/0249705 | A1 * | 12/2004 | Spencer et al. | 705/14 |
| 2006/0265312 | A1 * | 11/2006 | Rascoff et al. | 705/37 |
| 2006/0282275 | A1 * | 12/2006 | Pineda et al. | 705/1 |
| 2007/0092107 | A1 * | 4/2007 | Danielson et al. | 382/100 |

* cited by examiner

*Primary Examiner*—Pierre M Vital
*Assistant Examiner*—Truong V Vo
(74) *Attorney, Agent, or Firm*—Law Ofc SC Harris

(57) ABSTRACT

A real estate point of sale system puts optical indicia on a sign, and allows capturing the indicia, e.g., using the camera on a portable phone. Information from the picture is sent to a server, and used to retrieve and return information about the property.

13 Claims, 5 Drawing Sheets

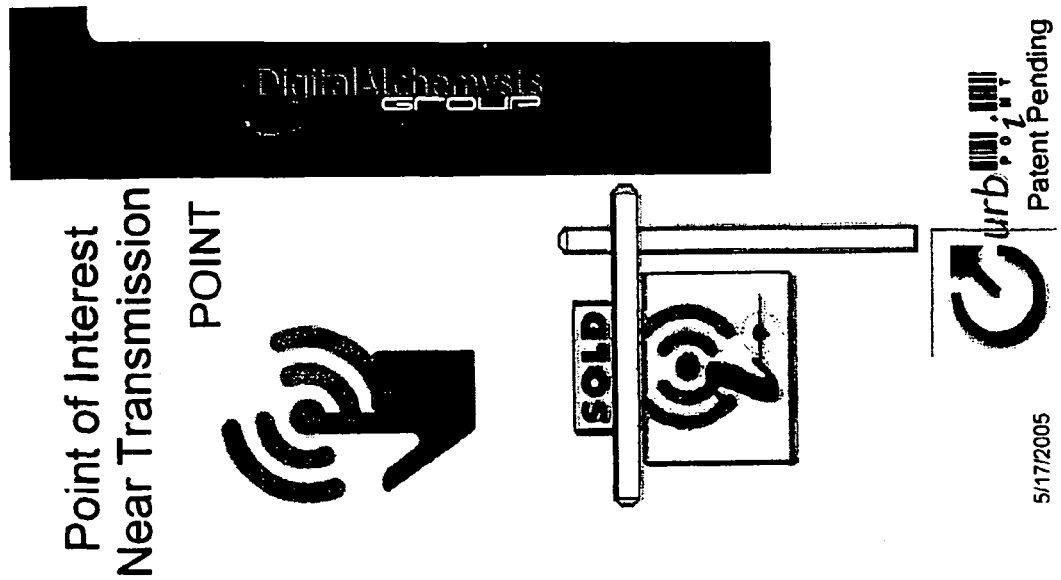
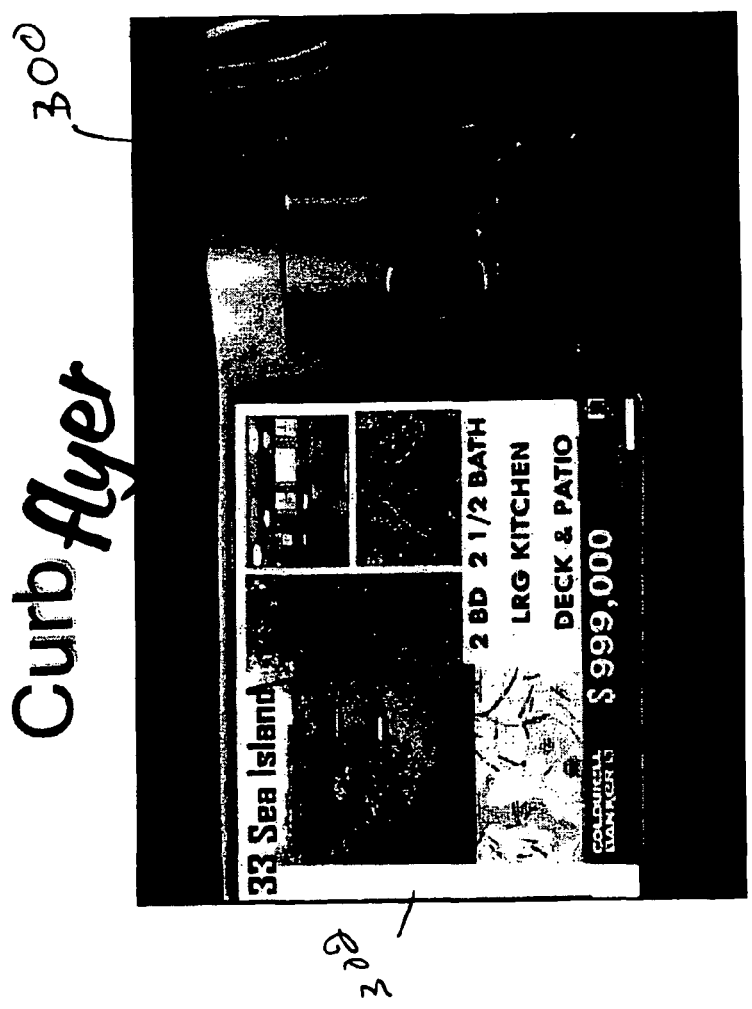
FIG 3A

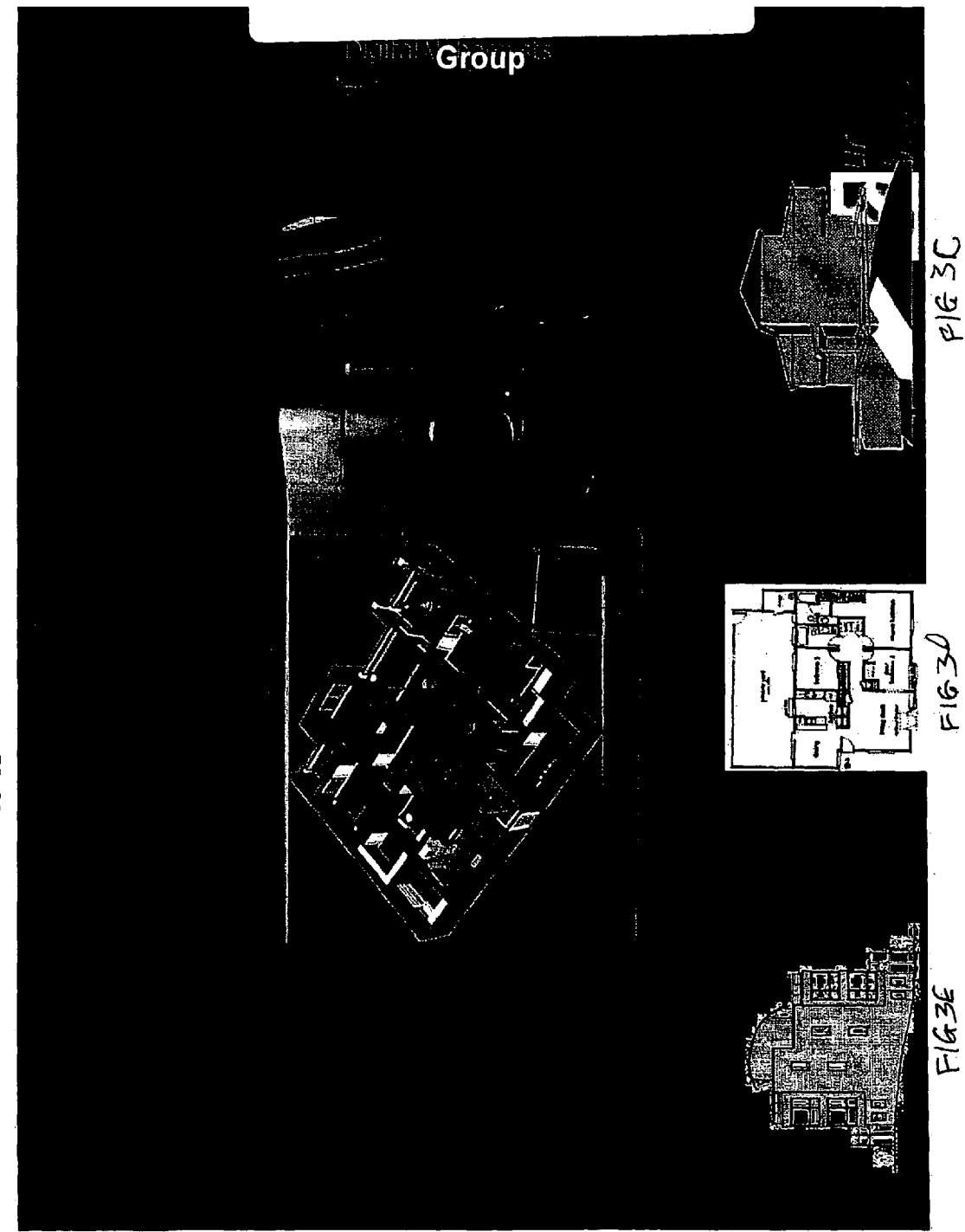

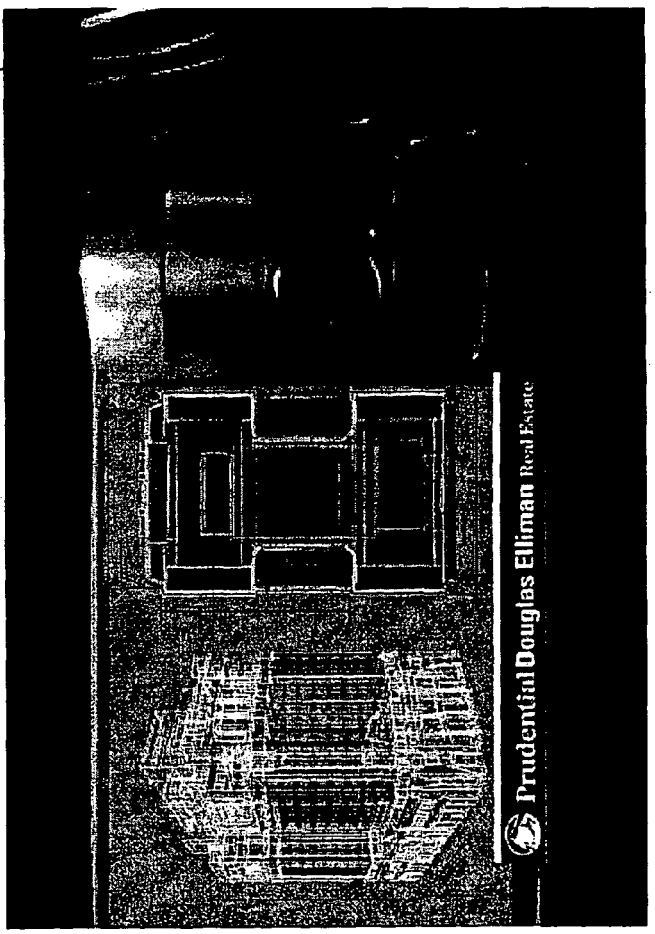
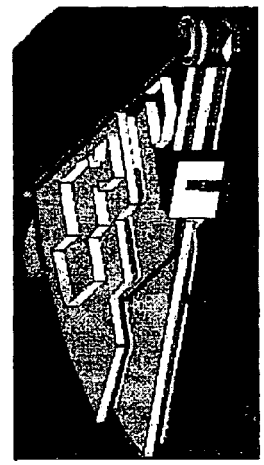
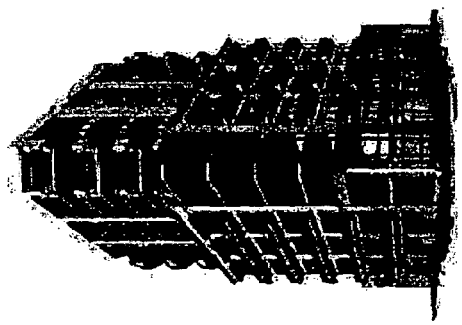
FIG 3F

SYSTEM FOR PROVIDING INFORMATION TO LOCAL REAL ESTATE PURCHASER

This application claims priority to provisional application No. 60/674,172, filed Apr. 21, 2005.

BACKGROUND

Advertising must draw a fine line between intrusiveness, and engaging the recipient with relevant, contextual and informative media messaging. The utility of raw data without context is marginal, at best.

Real estate sales rely on advertising to sell properties. The sales produce significant profits for the agents. A challenge in real estate is to make sure that a prospective buyer sees real estate that is appropriately tailored to what the buyer wants to see. This makes it more likely that the buyer will actually complete the sale.

There are opportunities for more consistent data collection and information dissemination mechanism at the point of sale itself, that is, at the property being sold.

Popular methods used by Real Estate Agents to sell properties include Yard Signs (75%), Internet (61%) and Open House (51%). In addition, approximately (60%) of those with Yard Signs also provide a sales property information flyer. They are accessed from a plastic box holder that is mounted on the "For Sale" sign post.

"Drive-bys", or people simply looking though neighborhoods is one way that people often find real estate in which they have interest. This allows prospective buyers an opportunity to explore a particular area in order to "get a feel for the community". This method is not only contextually superior, but more informative. However, the quality, consistency and availability of data about those properties is not easily acquired when remote or disconnected from the internet.

Informational flyers (or condensed sales brochures) may be available at the curb in an attempt to provide a condensed version of the key data that is available online via the internet to the user while they're contextually present. However, the flyers' print and reproduction quality runs the gamut and are typically low quality black and white copies that are poorly designed and universally inconsistent (i.e. no two flyers look alike or provide the same data set).

By their nature, a collection of paper-based brochures (or flyers) that are available to any passer-by provide no technical or automated means for customer relationship follow-up or management because no one knows who for sure picked them up. Many times, the boxes are empty.

SUMMARY

The present application describes a system which provides automatic return of information to a prospective purchaser when the purchaser is actually at a point of sale location near real estate. An embodiment describes using this system at, and as part of, a real estate sale system.

A portable client must be brought into the location of the point-of-sale, in an embodiment. The portable client obtains information from the point-of-sale, and transmits that information using its communication capabilities. Electronic information about a property is then automatically delivered to a prospective purchaser to the client at the point-of-sale, regarding a real estate property for sale.

The point-of-sale must also have some device for allowing the client to find the information. That device may be passive, for example, an optical indicia such as a barcode or a coded retroreflector. The device may alternatively be active, for example a short-range web server.

The information may be delivered automatically to a portable electronic device which is brought into the location of the property for sale.

Other aspects are also described, including a technique for allowing offers to be presented on the property, a technique allowing targeted advertising to be delivered, and a technique allowing the user to express interest in other properties, other than the ones specifically being viewed.

In an embodiment, a technique is disclosed for allowing a user to obtain information about a unique indicia of the property, and to get that entered into their mobile phone.

BRIEF DESCRIPTION OF THE DRAWINGS

In the Drawings;
FIGS. 3A-3F show different kind of content that can be returned to the client;

DETAILED DESCRIPTION

The general structure and techniques, and more specific embodiments which can be used to effect different ways of carrying out the more general goals are described herein.

Figure 1:
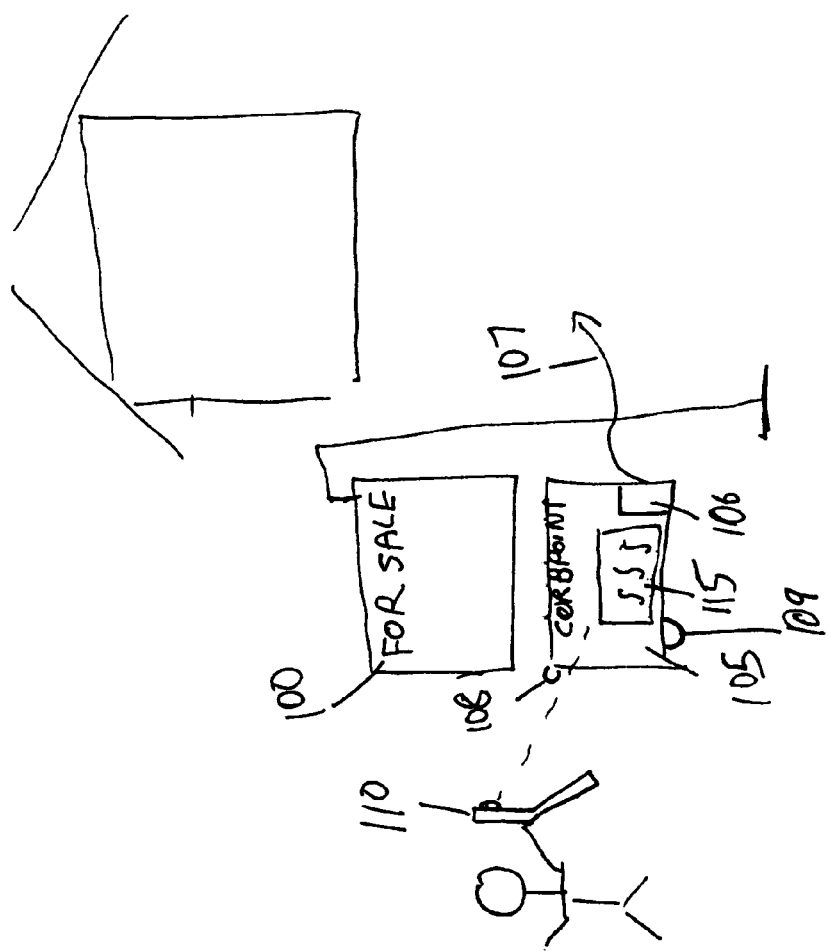
FIG. 1 shows a block diagram of an embodiment.

The present application teaches a system which provides point-of-sale information about a real estate property. While this system is applicable to other applications, the embodiment describes use with real estate. The interaction is initiated by a portable client computer. FIG. 1 shows the electronic device can be a thin client which is capable of wireless communication, for example a PDA, Blackberry or cellular telephone. The user of the client signals that that they are interested in information about the property, by bringing the device near to a special unit 105 in the area of the property.

In one aspect, the unit 105 can be entirely passive. In another aspect, the unit 105 may be actively transmitting some kind of information. For example, the unit 105 can include a web server 106 that transmits a short range signal 107 with certain kinds of information about the property.

Another aspect uses the client existing within an automobile. For example, mobile computing is currently done using GPS and traffic reports. Different ways of displaying information on the mobile client may be used. The screen which displays the traffic and/or computing information, can be used to display the real estate information.

All of these clients are referred to as portable thin clients. The word thin is used herein to denote that the client may have a limited amount of processing power. In addition, however, this can be done with a more powerful client, such as a laptop computer. While the portable thin client may be more ubiquitous in the driving-around-looking-at-real estate scenario, it should be understood that any client can be used in this scenario.

The portable thin client is automatically provided with information about the property in the vicinity. Moreover, this enables tracking of the users who have expressed interest.

In the FIG. 1 embodiment, the for sale sign, for the real estate for the real estate property 100 includes a curb point device 105 associated therewith. In this embodiment, the curb point device may be passive. The device may be any kind of indicia 115 which can be perceived by the client, and translated into a unique indicia. In the passive embodiments, this can be a barcode, or a coded retroreflector. In active embodiments, this may be based on a communication, such as a Bluetooth or network communication. Information about the actual real estate property in the area of the curb point device is sent to the thin client.

This communication may be done in a number of different ways. In one embodiment, an analog property identifier is used. For example, a property number is entered to obtain more information about the property.

In the embodiment shown in FIG. 1, a cell phone 110 may be the client. The cell phone 110 obtains an optical indicia 115 indicative of the curb point information. This can be done by taking a picture of the sign. A Java script program runs in the cell phone 110, and automatically recognizes specified aspects of the curb point indicia within the picture. The recognized indicia can be a barcode which is decoded using Semacode technology, a retroreflector which is analogously decoded using retroreflector reading technology. An alternative simply takes a picture, which picture has aspects either optically character recognized, or recognized in some other way. The device 105 may include an internal power source, e.g. or a solar cell shown as 108, which powers an internal battery. The battery may provide lighting for the optical indicia 115 either at night, or responsive to detection. For example, the device 115 may also include an infra red detector that automatically detects passing of a car or the presence of a person, and automatically illuminates the barcode 115.

Figure 2:
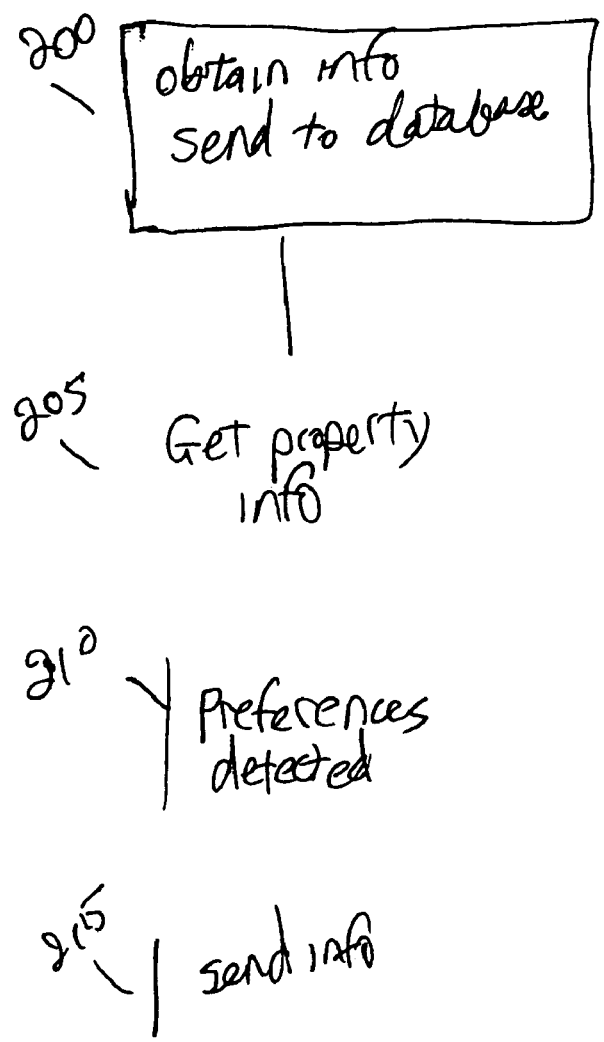
FIG. 2 illustrates a flowchart of operation.

Alternatively, the user can run the curb point program within the operating system on the cell phone, either before or after obtaining the picture. This program can be supplied on a computer readable storage medium and may follow the flow chart shown in FIG. 2. The information within the optical indicia is obtained and passed, using the phone's communication connection, to the curbpoint database, e.g. on a web site at 200. This may pass the entire image, to allow the processing to be carried out at the web site, or alternatively may extract the information locally and send it to the web site. If the web site receives the image, then the information in the image is decoded by the web site's server to obtain the information encoded within unique indicia. The unique indicia may include an optical item, e.g., a barcode, encoding an alphanumeric designation.

In either case, the information is used to access the database and to obtain information about the unique property at 205. At 210, preferences are detected. These preferences can include either preset preferences set by the user, and/or automatically set preferences that are determined by the property information itself, or the characteristics of the device that is doing the requesting. Information indicative of the unique property is then sent back to the client at 215, using wireless communication, either via a Web type connection, an SMS connection, or any other type of data enabled connection.

At the same time, the database may capture certain information from the cellular telephone. It may capture SMS information or the like. Alternatively, in a more privacy enhanced mode, the web site may simply capture information indicative of a unique identifier indicative of the cell phones identity on the curb point network The database stores various kinds of information about each property. Each form may be tailored to a specific kind of client, and to a specific species of the client. For example, information of type 1 may be stored for a cell phone display, and within the information of type 1, there may be different types that are optimized for different kinds of cell phones. Information of type 2 may be specific to a PDA display, and information of type 3 may be optimized for a Blackberry, and information of type 4 may be optimized for a portable laptop computer. Other types of information may also be contemplated. The information is then returned, here to the cell phone. The cell phone receives information receives any of the following information:

FIG. 3A shows a first kind of content which can be delivered to the cellular phone 300. The content 302, as shown, basically provides a flyer of the property, showing the grounds, the inside view, a map of the area, some basic information, and an asking price. The user may set the options to get a flyer view as their initial view, and by pressing a special key or asking for more information, may obtain different views.

Another view is shown in FIG. 3B. FIG. 3B shows detailed plans that can be provided, a cutaway view as shown in FIG. 3B, a side view of the house as shown in FIG. 3C, a floor plan shown in FIG. 3D, and another side view of the House shown in FIG. 3E. The user can select more, can select up and down, to go between the different views.

According to another aspect, a virtual 3-D model of the property can be shown, as provided in FIG. 3F which shows a 3D model of the building, although the model can be showing parts other than the building. The arrow keys on the phone, 350, can be used to arrow between different views of the building from different advantages. This can be a continuous view, where holding the key changes the vantage point. Alternatively, each click of the key can provide a different vantage point from a different view. The information may also include a link to a web site which can be later access via other browser. The information may also include a field which allows obtaining more information, sending it to an e-mail address, or some other form. This can also be added to a users "favorites" page within the curb point web site. A user can also send contact information to request contact from the agent. A unique and beneficial benefit might include providing users a contextual inquiry point or ability to connect to the owner or agent, at will. Different ways of enabling this may include push-to-talk phones that could accommodate such arrangements. In one aspect, the curb point web site collects information about the web site that requested additional information and may use this information demographically. If the user indicates that they want more information, they may receive that information immediately, assuming their request is communicated appropriately and understood.

In another aspect and or via synchronization of unique user requirements or attributes upon review of the "drive-by" information gathered at the same location to which they receive the other information.

Other aspects are possible, and while this describes the basic embodiment, further embodiments are described herein which provide different content to different kinds of clients, provide more or less information, and to the web site, and also provide more or less power or energy to the actual curb point web site.

In the second embodiment, the device at the point of sale is an active device rather than a passive device. For example, it may be a form of small web server which allows clients in the vicinity of the web server to receive information. For example, this may be a device that transmits a web page over an 802.11 wireless link to any devices in range that choose to accept the transmission. This can use conventional technology to force devices in range, once accepting the transmission to default to the home page that is associated with property for sale. This is conventional, for example, in various hotels and other pay-per-use sites where logging on to the specified server forces the user to the server's home page, even if it differs from the home page within the browser.

In this embodiment, the web server can capture various information from the computer that is requesting the web page. Moreover, that computer may be prompted to provide certain contact information, either optionally or as a condition of receiving the web page information.

In another aspect, the web server that is local to the area may transmit by some other local and low-power technique, such as Bluetooth or Zigbee.

In another aspect, the kind of information that the user receives on the portable device may be selectable and tailored to the kind of information that they want. For example, the user may select to always receive three-dimensional content on their cell phone. A file of preferences can be created in this way, so that the users will always receive information in the forms they want.

In this aspect, a preferred mode may be a script which runs on the cell phone, automatically receiving and recognizing valid curb point indicia within the picture that it takes, automatically recognizing that information, and automatically initiating a communication when that picture is detected.

Examples of Initiation and/or Detection, Validation, Permission.

POINT and capture a photo of the FOR SALE SIGN and its standardized visual identifier, e.g., QR Code or Intelli-Dot type signal or barcode Turn on phone, Point at sign (or property) and make selections Bluetooth Delivered Splash Invitation Screen to Mobile Access Device "Would you like a CurbFlyer for this property . . . 33 Sea Island Drive?"

Returned options may include choices:

Facts (Text),

Visuals (Graphic Art/Pictures),

Tour (Multi-media)

Display Information Desired and Selected on Device (CurbFlyer Appears on Phone Screen)

Copy Uploaded to Website "MyCurbPointHomeSearch.com" for future reference, review Text Message Confirmation with Instructions and Code for User to sign-in to Website.

An important feature of this system is its ability to use locally-obtained information. For example, information access and distribution (transmission) may be limited to devices that are physically near, within view (i.e. range of network), proximity-dependent to the desired property. Privacy concerns are minimized due to the fact that this system does NOT require or monitor arriving from GPS coordinates or collection any geographic data outside the range of the said network transmission area.

Other aspects are also contemplated. The system can be used for a curb offer, effectively for allowing the user to place an offer over the curb point system.

The curb point system can also be used to allow advertising that is tailored to the kind or location of houses to be automatically delivered.

Another aspect, called "secret agent", allows the user to find information on a house, and then to indicate their interest in a different house, even a property that is not yet on the market. For example, the user may select secret agent, and then indicate that they are interested in a different house, by entering either the address, or some information about the different house, or send an mobile email trigger with the unique property identifier to CurbPoint Network Operations to request a monitoring service be established.

In another aspect, off-line production is possible. The user can take pictures of the optical indicia, either with a digital or analog camera, or just with the cell phone, and select later which of those pictures to use to find more information later on.

The CurbPoint information server may be formed according to the block diagram shown in FIG. 4. A Main processor 400 communicates with a database storage unit 405 which can be for example a hard drive. The main processor is connected to a communication part for 10 which can be cellular communication, telephone line communication, WiFi, Bluetooth, or any other aspect. If the server is portable, a battery power can be provided shown as for to me. If the server is portable, the storage unit 405 may be removed, e.g. a solid-state type memory device.

Any of the flowcharts and/or operations described herein may be stored as instructions on a computer readable medium.

Although only a few embodiments have been disclosed in detail above, other embodiments are possible and the inventor(s) intend these to be encompassed within this specification. The specification describes specific examples to accomplish a more general goal that may be accomplished in other way. This disclosure is intended to be exemplary, and the claims are intended to cover any modification or alternative which might be predictable to a person having ordinary skill in the art. For example, other clients can be used, and other techniques of getting information into the clients can be used.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method comprising:

optically sensing a device in an area of a real estate for sale, said device including a unique indicia indicative of the real estate, said device being wholly passive, and said optically sensing comprising sensing a wholly passive device, wherein said optically sensing comprises using a camera in a mobile phone to obtain an image of the indicia;

from the mobile phone which is capable of wireless communication, signaling, using said indicia from said device, to indicate a request for additional information about the real estate, wherein said signaling comprises using a camera in the mobile phone to obtain information about said indicia, and send said unique information to a remote server; and receiving information on the mobile phone about said real estate responsive to said request, wherein said information is obtained from a remote server which stores information about plural different real estate, and returns that information responsive to said signaling, wherein said server returns three-dimensional mapped information about the property for sale, and wherein said server returns information about other properties for sale in the vicinity of said one property whose unique indicia is received.

2. The method as in claim 1, wherein said information includes information that is contained within the optical indicia, contained by decoding said optical indicia.

3. The method as in claim 1, wherein said information includes an image of the optical indicia itself, and further comprising decoding said optical indicia at said remote server, and using the information therefrom to address a database at the remote server.

4. The method as in claim 1, wherein said unique indicia includes a barcode.

5. The method as in claim 1, wherein said unique indicia includes a coded retroreflector which is coded to represent unique information.

6. A computer-readable storage medium containing a set of instructions for a mobile computer, the set of instructions causing the mobile computer to:
   automatically obtain optical information about a unique indicia located on a sign associated with an item for sale using a camera in the mobile computer, where said automatically obtain comprises obtaining information from a wholly passive sign, said determine being carried out in the mobile computer that automatically obtains the optical information;
   determine information from said unique indicia, without requiring any active transmission by said sign;
   send said information to a remote server which includes additional information about said item for sale; and
   receiving information on the mobile computer about said real estate responsive to said request,
   wherein said information is obtained from a remote server which stores information about plural different real estate, and returns that information responsive to said signaling, wherein said server returns three-dimensional mapped information about the property for sale, and wherein said server returns information about other properties for sale in the vicinity of said one property whose unique indicia is received.

7. The medium as in claim 6, wherein said instructions decode a portion of said indicia, to determine a unique identifier that is encoded within said indicia, and send said unique identifier to said remote server.

8. The medium as in claim 7, wherein said unique identifier is included within an optical barcode.

9. The medium as in claim 7, wherein said unique identifier is included within an encoded retroreflector.

10. A system, comprising:
    a database which includes information about a plurality of properties for sale;
    a network connection, connected to allow access to said database,
    a processor, associated with said database, and receiving information indicative of queries from a plurality of different mobile clients, each of said queries representing information indicative of a optically sensed unique indicia representing said properties, said unique indicia having been optically sensed by each said mobile client without any transmission from said optically sensed unique indicia; and
    said processor operating to return additional information responsive to said unique indicia, where a first query with a first indicia returns a first information about first property for sale, and where a second query with a second indicia returns a first information about a second property for sale, different than said first property for sale,
    wherein said database returns three-dimensional mapped information about the property for sale, and wherein said database returns information about other properties for sale in the vicinity of said one property whose unique indicia is received.

11. The system as in claim 10, further comprising a field which allows making an offer to buy said one property.

12. The system as in claim 10, wherein said unique indicia includes a barcode encoding an alphanumeric designation.

13. The system as in claim 10, wherein said unique indicia includes a retroreflector encoding an alphanumeric designation.

* * * * *